United States Patent
Sadanowicz et al.

(10) Patent No.: US 7,159,316 B2
(45) Date of Patent: Jan. 9, 2007

(54) METHOD OF MANUFACTURING A MODULAR CORNER ASSEMBLY

(75) Inventors: David Thomas Sadanowicz, Canton, MI (US); Larry William Brackmann, Brighton, MI (US); Don Paul Ward, Westland, MI (US)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 10/904,202

(22) Filed: Oct. 28, 2004

(65) Prior Publication Data

US 2006/0096097 A1 May 11, 2006

(51) Int. Cl.
- B62D 7/18 (2006.01)
- B21K 1/40 (2006.01)
- B21K 1/04 (2006.01)
- B23P 17/00 (2006.01)
- B23P 11/00 (2006.01)
- B21D 53/10 (2006.01)
- F16C 32/00 (2006.01)

(52) U.S. Cl. .......... 29/894.361; 29/894.362; 29/898.062; 29/898.063; 29/898.066; 29/898.07; 29/898.09; 29/407.05; 29/407.1; 29/434; 29/509; 29/512; 29/557; 29/559; 280/93.512; 384/560; 82/1.11

(58) Field of Classification Search .......... 29/894.361, 29/894.362, 898.062, 898.063, 898.066, 29/898.07, 898.09, 407.05, 407.09, 407.1, 29/434, 509, 512, 557, 558, 559; 280/93.512; 384/448, 560; 82/1.11, 112

See application file for complete search history.

(56) References Cited

U.S. PATENT DOCUMENTS

| | | | |
|---|---|---|---|
| 4,150,468 A * | 4/1979 | Harbottle | 29/898.09 |
| 4,203,635 A * | 5/1980 | Reiter | 384/560 |
| 5,496,055 A | 3/1996 | Shibahata et al. | |
| 5,556,210 A | 9/1996 | Fukumura | |
| 6,212,981 B1 | 4/2001 | Brinker et al. | |
| 6,406,188 B1 | 6/2002 | Lin et al. | |
| 6,464,399 B1 * | 10/2002 | Novak, Jr. et al. | 384/477 |
| 6,532,666 B1 | 3/2003 | Denny et al. | |
| 6,585,420 B1 | 7/2003 | Okada et al. | |
| 6,626,580 B1 | 9/2003 | Tajima et al. | |
| 6,637,943 B1 * | 10/2003 | Novak et al. | 384/477 |
| 6,644,861 B1 * | 11/2003 | Hacker et al. | 384/589 |
| 6,729,633 B1 | 5/2004 | Irwin | |
| 6,736,418 B1 | 5/2004 | Wang | |
| 6,796,029 B1 | 9/2004 | Maxur et al. | |
| 6,829,825 B1 * | 12/2004 | Bowman et al. | 29/894.32 |

\* cited by examiner

*Primary Examiner*—Jermie E. Cozart
(74) *Attorney, Agent, or Firm*—Leo H McCormick, Jr.; Sarah Taylor

(57) ABSTRACT

A module corner assembly wherein a wheel hub is permanently attached to a knuckle and various surfaces on the wheel hub and knuckle are machined in a same fixture utilized in holding the knuckle to deform an end on the wheel hub against a cone of a bearing. When a rotor is thereafter attached to the wheel hub it is also machined in the same fixture such that a perpendicular relationship is established between the axis of the wheel bearing and braking surfaces on the rotor and as a result a desired lateral run out relationship is achieved between the axis of the bearing and rotor surfaces.

22 Claims, 11 Drawing Sheets

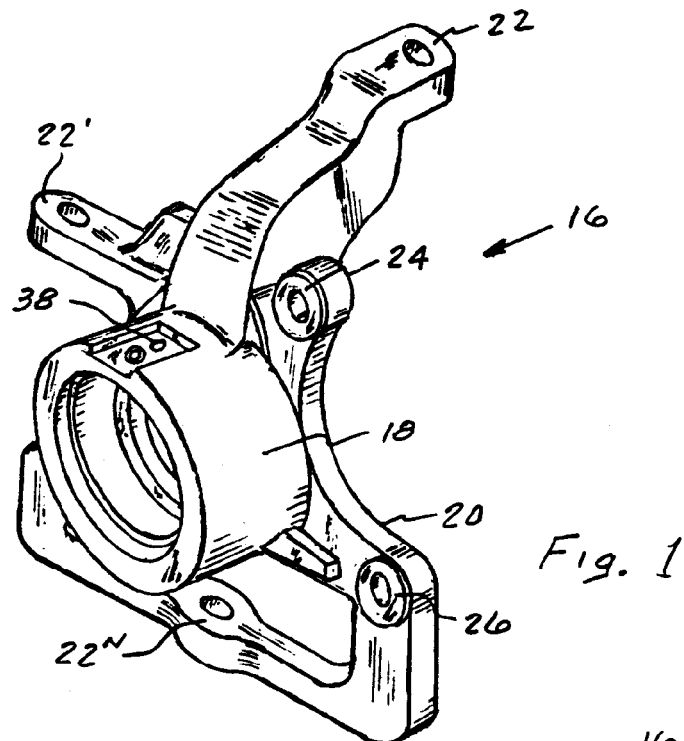
Fig. 1
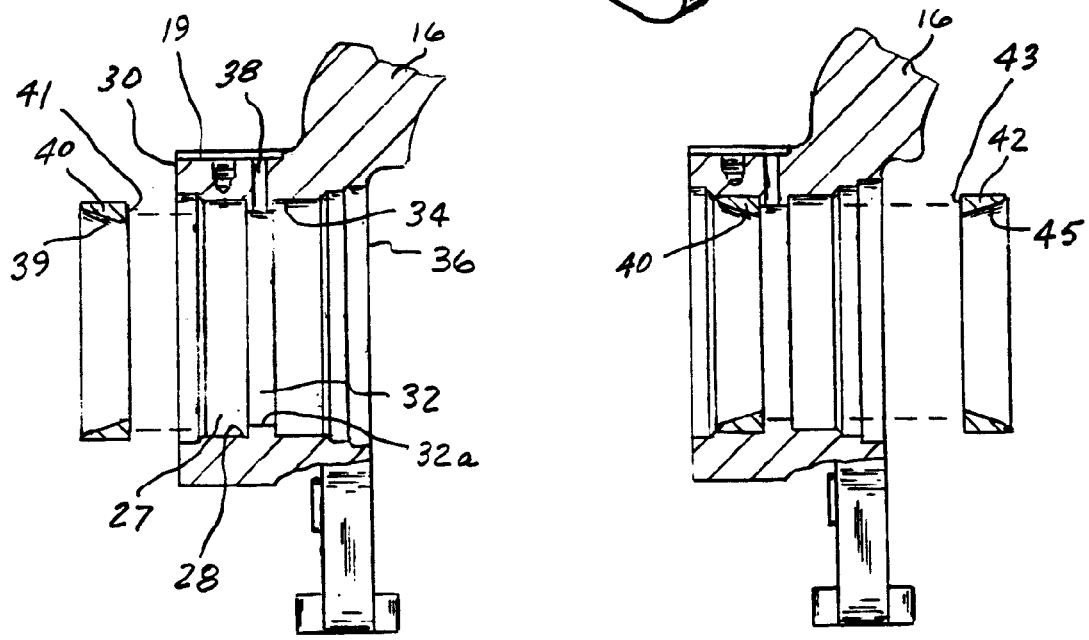
Fig. 2
Fig. 3

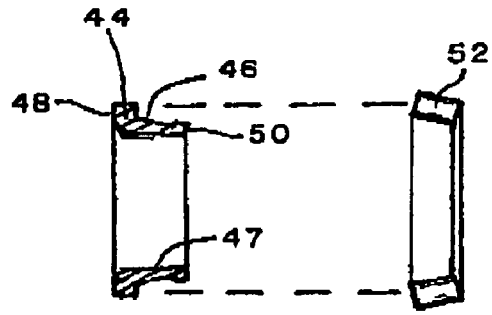
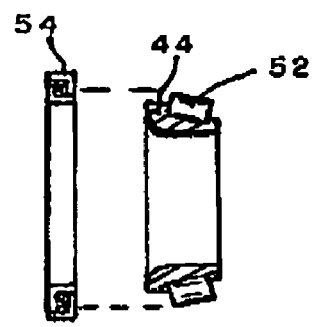
FIG. 4    FIG. 5
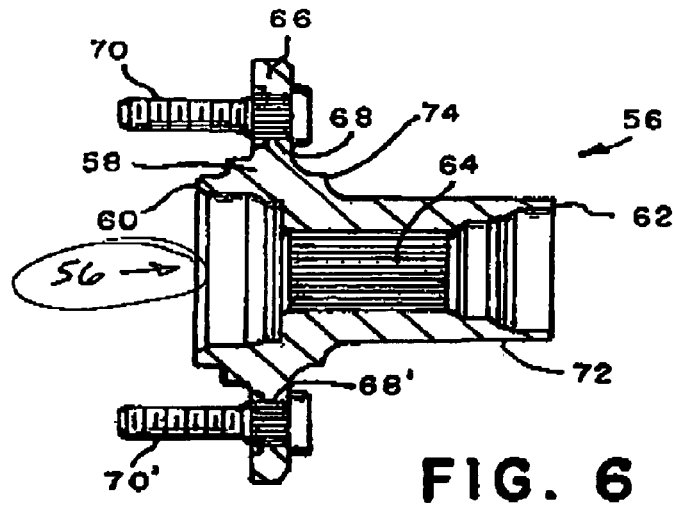
FIG. 6
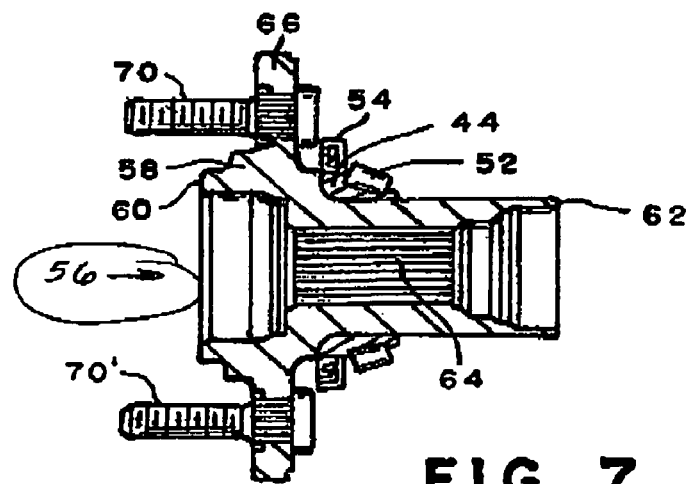
FIG. 7

METHOD OF MANUFACTURING A MODULAR CORNER ASSEMBLY

This invention relates to a process of manufacturing a module corner assembly having wheel hub permanently attached to a knuckle to define a unitary structure.

BACKGROUND OF THE INVENTION

Disc brake systems are commonly used on the front axle of most vehicles because of efficiency in stopping a vehicle. In such systems, a bearing assembly is fixed to a wheel hub that is bolted to a knuckle member, a brake rotor is thereafter attached to the wheel hub and a caliper is bolted to the knuckle member spans the rotor. The knuckle member is pivotally attached to the frame of the vehicle and a caliper is bolted to the knuckle to locate the first and second friction members on opposite sides of the rotor to define a corner assembly. During braking the friction members are moved into engagement with corresponding braking surfaces on the rotor to effect a brake application. Unfortunately, while the individual manufacturing tolerance of the various components that make up a corner assembly may be within desired limits when the tolerances are combined or added together a relationship may occur wherein a hub mounting surface on the wheel hub for the rotor and/or braking surface on the rotor are not in perpendicular alignment with the axis of the wheel bearing. In an effort to maintain or achieve a perpendicular relationship a process has been proposed in U.S. patent application Ser. No. 10/355,409 now U.S. Pat. No. 6,829,825 to assemble a corner module and machine surfaces on the wheel hub after attachment to a knuckle. While this process does provide an initial perpendicular relationship for the rotor with respect to the axis of the bearing, often on replacement of the rotor the perpendicular relationship is not duplicated.

SUMMARY OF THE INVENTION

It is an object of the present invention to provide a corner module assembly for a vehicle with unitary wheel hub and knuckle assembly wherein a rotor is retained on the wheel hub in perpendicular alignment with the axis of the axis of a roller that links the wheel hub with the housing for the knuckle assembly.

In more detail, the module corner assembly is manufactured by a method wherein a wheel hub is attached to a knuckle through the following steps:

a knuckle having a first cylindrical body with a plurality of projections that extend there from, an outboard axial bore that extends from a first end surface to an annular rib, an inboard axial bore that extends from a second end surface to the annular rib is obtained from a source, the annular rib having an axial bore that connects the outboard and inboard axial bores, and a radial bore that extends from the axial bore to a peripheral surface on the cylindrical body is obtained from a source;

an outboard cup is obtained from a source and pressed into the outboard axial bore of the knuckle until it engages the annular rib;

an inboard cup is obtained from a source and pressed into the inboard axial bore of the knuckle until it engages the annular rib;

an outboard cone is obtained from a source and a first roller assembly is placed on the outboard cone, the outboard cone having a second axial bore that extends from a first end to a second end;

the outboard cone is inserted into the outboard axial bore to bring the first roller assembly into engagement with a first bearing surface on the outboard cup;

measuring a first linear distance from a reference point on the outboard cone to a second reference point on the inboard cup;

obtaining an inboard cone from a source that is defined by a third axial bore that extends from a first end to a second end;

placing a second roller assembly on the inboard cone;

measuring a second linear distance from a first end of the inboard cone to a third reference point on the second roller assembly;

comparing the second linear distance with the first linear distance and removing material from the first end of the inboard cone when the second linear distance is greater than the first linear distance to match the second linear distance with the first linear distance or selecting another inboard cone for the source wherein the second linear distance does match the first linear distance;

obtaining a ring having a surface with sequential surface differences from a source and placed the ring on the inboard cone;

inserting the inboard cone into the inboard axial bore of the knuckle to bring the second roller assembly into engagement with a bearing surface on the inboard cup and to align the ring with the radial bore in the first cylindrical body;

locating a first seal between the first end surface on the knuckle and the outboard cone and a second seal between the second end surface on the knuckle and the inboard cone to seal the outboard bore, axial bore and inboard bore from the surrounding environment;

placing the knuckle in a fixture;

obtaining a wheel hub from a source that is defined by a second cylindrical body with a first end and a second end, a fourth axial bore that extends from the first end to the second end, a radial flange that extends from the second cylindrical body and is located adjacent said first end, the flange having a plurality of axial openings that are located a fixed radial distance from the axis of the fourth axial bore, and a peripheral bearing surface that extends from a shoulder adjacent said flange to said second end;

pressing the second cylindrical body of said wheel hub into second axial bore of outboard cone and the third axial bore of the inboard cone such that the shoulder thereon engages the first end of the outboard cone and the second end thereon extends past the first end of the inboard cone and the outboard cone and the inboard cone are located on the peripheral bearing surface on the wheel hub;

bringing a first tool into engagement with the second end of the second cylindrical body to deform the second end and define a unitary structure and a second tool into engagement with the annular flange on the wheel hub to remove material from the wheel hub to define a perpendicular surface thereon with respect to the axis of the first and second roller assemblies;

obtaining a rotor from a source and securing the rotor in engagement with the perpendicular surface of the wheel hub;

bringing a third tool associated with the fixture into engagement with first and second surfaces on the rotor and the wheel hub and rotating the wheel hub to remove any material from the rotor that may effect a corresponding perpendicular relationship with the axis of the first and second roller assemblies; and bringing a fourth tool associated with the fixture into engagement with the knuckle to remove material from bosses on the housing that receive a bracket for a caliper of a brake such that when the caliper is attached to the knuckle a perpendicular relationship is established and friction members may be axially aligned with the braking surfaces on the rotor.

It is an object of this invention to provide a method of manufacturing a module corner assembly for a vehicle constructed from a plurality of loose components that include a single row of robust bearings and seals designed to survive for a considerably period of time and wherein the end play for the bearings is individually set for each assembly.

It is a further object to this invention to provide a corner assembly for a vehicle wherein end play for a rotor is reduced by machining braking surfaces on a rotor while clamping on a knuckle to eliminate tolerances associated during the assembly of the individual components.

It is another object of this invention to provide a corner assembly for a vehicle wherein a same fixture is utilized to machine an anchor bracket boss on a knuckle and friction surfaces on a rotor in parallel planes such that brake pads carried by a caliper are aligned with the friction surfaces during a brake application.

The present invention provides a module corner assembly wherein braking surfaces on rotor are located in a perpendicular relationship with an axis of a bearing assembly while a caliper attached to a knuckle retains friction members in a same parallel relationship with the braking surfaces.

BRIEF DESCRIPTION OF THE DRAWINGS

FIG. 1 is a perspective view of a knuckle for use in a module corner assembly according to the present invention;

FIG. 2 is an enlarged sectional view of a portion of the knuckle prior to the insertion of an outboard cup into an axial bore of the cylindrical body of FIG. 1;

FIG. 3 is a sectional view of the knuckle of FIG. 2 prior to the insertion of an inboard cup into the axial bore of the cylindrical body;

FIG. 4 is a sectional view of an outboard cone and a roller assembly;

FIG. 5 is a sectional view of the outboard cone of FIG. 4 with the roller retained thereon and a seal aligned with the outboard cone;

FIG. 6 is a sectional view of a wheel hub;

FIG. 7 is a sectional view of the wheel hub of FIG. 6 with the outboard cone and seal of FIG. 5 located on a peripheral bearing surface;

DETAILED DESCRIPTION OF THE INVENTION

In the various embodiments for a module corner assembly, same components are identified by a same number and only when structural components are different is a new number assigned even though they may function in a similar manner.

Figure 21:
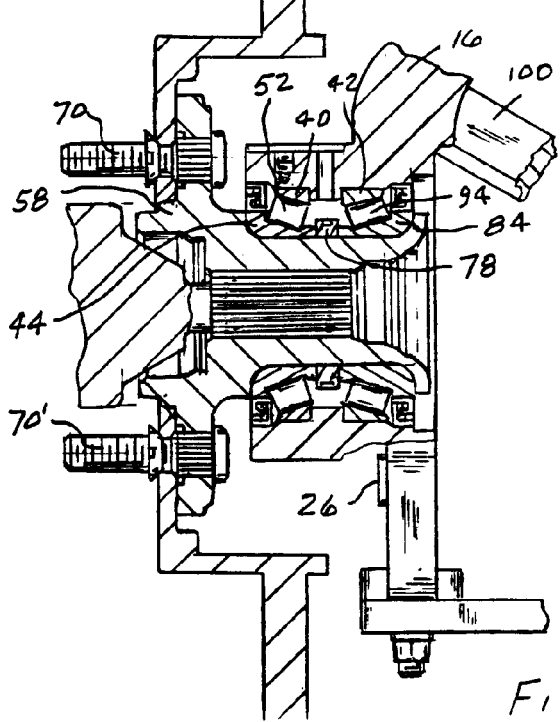
FIG. 21 is a sectional view of the rotor attached to the wheel hub in FIG. 19 wherein braking surfaces on the rotor are machined to define a perpendicular relationship with the axis of the wheel hub.
Figure 22:
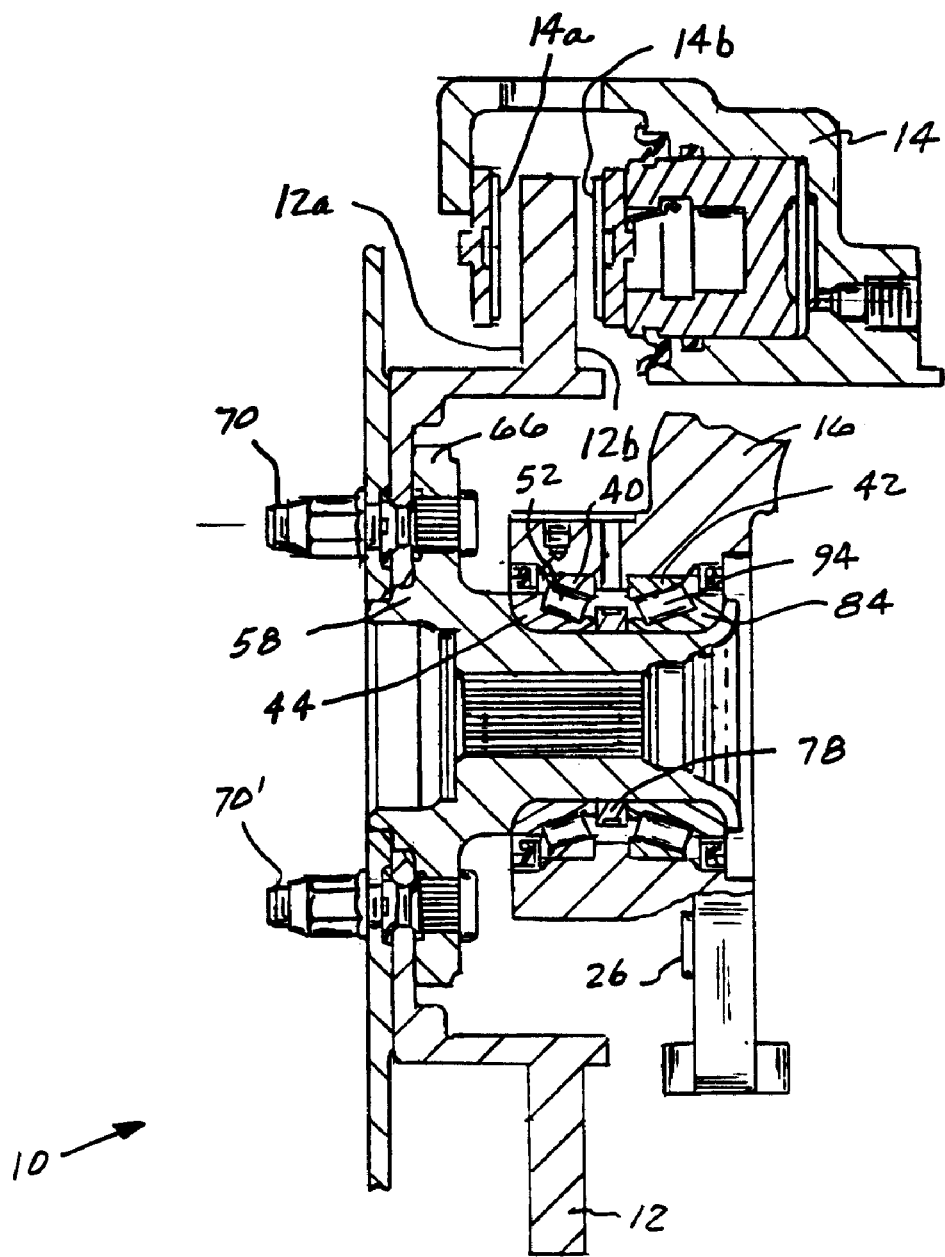
FIG. 22 is a sectional view of the rotor attached to wheel hub and caliper attached to the knuckle to define a module corner assembly according to the present invention.

A module corner assembly 10 of the present invention is illustrated in FIG. 22 and is manufactured through a succession of steps illustrated in FIGS. 1–21. The corner assembly 10 is distinguished in that braking surfaces located on a rotor 12 are located in parallel alignment with wear faces on friction members that are retained in a caliper 14 that spans the rotor 12. The parallel alignment enhances the uniform engagement of the wear surfaces and braking surfaces while reducing surging during rotation of the rotor 12 and as a result a reduction in rotation is essentially a linear function.

A preferred method of manufacturing the module corner assembly 10 may be achieved through the following sequentially steps.

A knuckle 16 as shown in FIG. 1 is obtained from a source. The knuckle 16 is distinguished by cylindrical body 18 that extends from a base 20 from which a plurality of projections 22,22'... 22" extends of which bosses 24 and 26 define brackets for attaching caliper 14. The cylindrical body 18 has an axial bore 27 defined by an outboard section 28 that extends from a first end surface 30 to an annular rib 32 and an inboard section 34 that extends from a second end surface 36 to the annular rib 32. The annular rib 32 has an inner diameter 32a that connects the outward section 28 with the inboard section 34 and a radial bore 38 that extends from inner diameter 32a to a peripheral surface 19 on the cylindrical body 18. In each knuckle the outboard section 28 and inboard section 34 of the axial bore 27 are machined finished to a same desired diameter.

A outboard cup 40, as shown in FIG. 2, is obtained from a source and pressed into the outboard section 28 of axial bore 27 until face 41 engages annular rib 32 to define an outboard ramped race 39 within the cylindrical body 18. The outboard cup 40 is case hardened and resistant to wear caused by the engagement with rollers.

A inboard cup 42, as shown in FIG. 3, is obtained from a source and pressed into the inboard section 34 of axial bore 27 until face 43 engages annular rib 32 to define an inboard ramped race 45 within the cylindrical body 18. The inboard cup 42 is case hardened and resistance to wear caused by the engagement with rollers.

A outboard cone 44, as shown in FIG. 4, is obtained from a source and defined by a ramped race 46 located between a flange 48 and a lip 50. A first roller assembly 52 is selected from a source and placed on the ramped race 46 as illustrated in FIG. 5. An outboard seal 54 defined by inner and outer rings separated by a resilient member is obtained from a source and pressed onto the outboard cone 44.

A wheel hub 56, as illustrated in FIG. 6, and defined by a cylindrical body 58 with a first end 60 and a second end 62 is obtained from a source. The cylindrical body 58 has a splined axial bore 64 that extends from the first end 60 to the second end 62, a radial mounting flange 66 that extends from the second cylindrical body 58 and is located between the first end 60 and the second end 62, a plurality of axial openings 68,68' in the mounting flange 66 that are located a fixed radial distance from the axis of the axial bore 64 for receiving mounting studs 70,70' and a peripheral bearing surface 72 that extends from the second end 62 to a shoulder 74 adjacent the radial mounting flange 66.

The outboard cone 44 with the roller assembly 52 and outboard seal 54 is pressed onto the peripheral bearing surface 72 to bring the outboard cup 44 into engagement with shoulder 74 as illustrated in FIG. 7.

Figure 8:
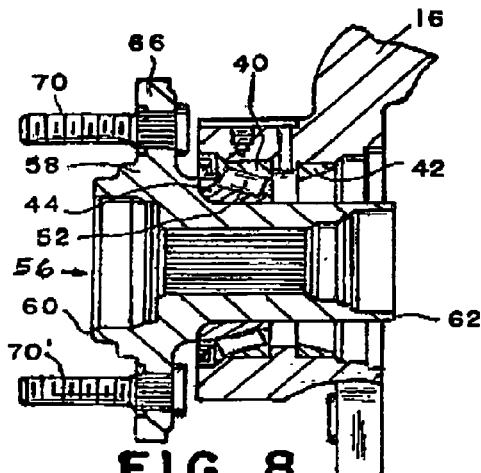
FIG. 8 is a sectional view of the knuckle of FIG. 6 with the wheel hub of FIG. 7 inserted into the axial bore of the cylindrical body.

Thereafter, the cylindrical body 58 is inserted into the axial bore 27 in cylindrical body 18 such that the first roller assembly 52 engages bearing surface defined by race 39 on the outboard cup 40 at which time outboard annular seal 54 also engages end surface 30 define an outboard seal from of the surrounding environment as shown in FIG. 8.

Figure 9:
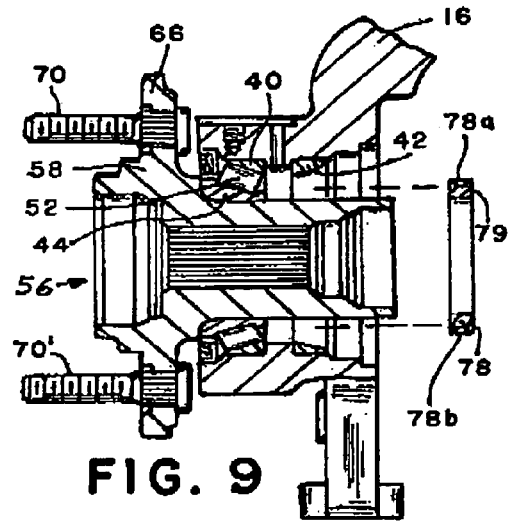
FIG. 9 is a sectional view of the knuckle and wheel hub of FIG. 8 prior to the insertion of a sensor ring into the inboard bore.
Figure 10:
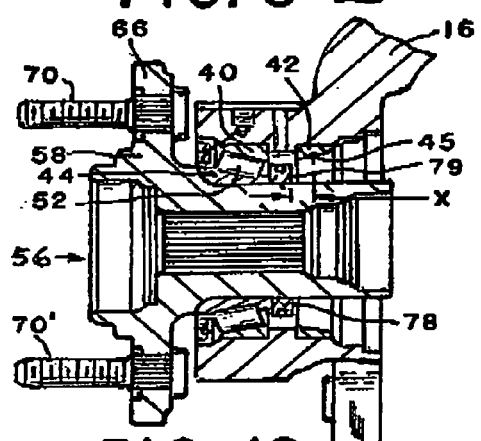
FIG. 10 is a sectional view of the knuckle and wheel hub of FIG. 9 after the insertion of the sensor ring.

A ring 78, as shown in FIG. 9, defined by a peripheral surface having sequential differences 78a, 78b thereon (different materials, teeth or shapes) is obtained from a source. The ring 78 is pressed on the peripheral bearing surface 72 and brought into engagement with the outboard cone 44 such that ring 78 is brought into alignment with radial bore 38 in the first cylindrical body 18, as illustrated in FIG. 10. The ring 78 defining a tone wheel or actuator for a sensor 38a that is later located in radial bore 38.

A first linear distance "x" is measured from a face 79 on ring 78 to a first reference point 45 on the inboard cup 42.

Figures 11, 12:
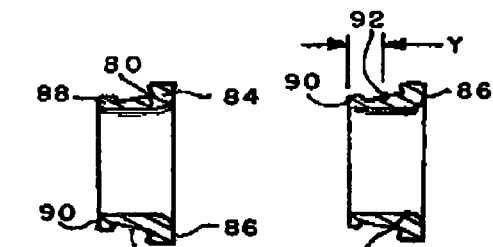
FIG. 11 is a sectional view of an inboard cone.
FIG. 12 is a sectional view of the inboard cone of FIG. 11 showing a linear distance between a first end and a bearing race.
Figure 13:
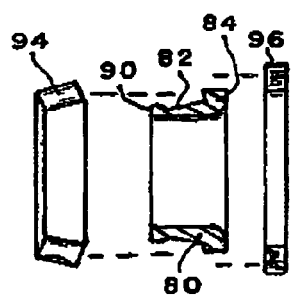
FIG. 13 is a sectional view of the inboard cone of FIG. 11 prior to a roller member being placed on the bearing race and an inboard seal being attached to a second end thereof.

This measurement is important and later used in selecting an inboard cone 80 from a source. The inboard cone 80, as illustrated in FIG. 11, is obtained from a source and defined by a ramped race 82 that is located between a flange 84 on a first end 86 and a lip 88 on a second end 90. A second roller assembly 94 as illustrated in FIG. 13 is selected from a source and placed on the ramped race 82 on the inboard cone 80. With the second roller assembly 94, a distance from end 90 to a reference point 92 is obtained that represents a second linear distance "y" between the second roller assembly 94 engagement surface and the second end 90. The second linear distance "y" is compared with the first linear distance "x" to compensate for any stack up of tolerances that may later affect the parallel relationship of the components in the corner assembly 10. If the second linear distance "y" is greater than the first linear distance "x" material is removed from the second end 90 until the second linear distance "y" for this particular inboard cone 80 matches the first linear distance "x".

Thereafter, an inboard annular seal 96 is selected from a source and aligned with the flange 84 on the first end 86 of the inboard cone 80.

Figure 14:
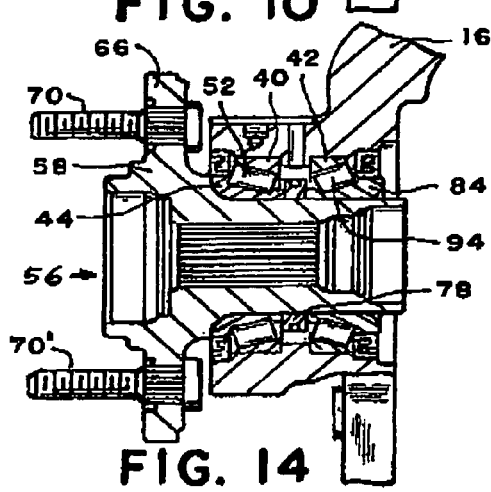
FIG. 14 is a sectional view of the wheel hub and knuckle of FIG. 10 with the second cup, roller and annular seal inserted into the inboard bore.

The inboard cone 80 is pressed onto the peripheral bearing surface 72 on the second cylindrical body 58 until the end 90 engages face 79 on ring 78 and the engagement surface of the second roller assembly 94 engages a second bearing surface defined by ramp race 45 on the inboard cup 42, as shown in FIG. 14.

The inboard annular seal 96 is pressed onto flange 84 of the inboard cone 80 such that the inboard annular seal 96 engages the second end surface 36 to define an inboard seal with respect to the surrounding environment, as shown in FIG. 14.

Figure 15:
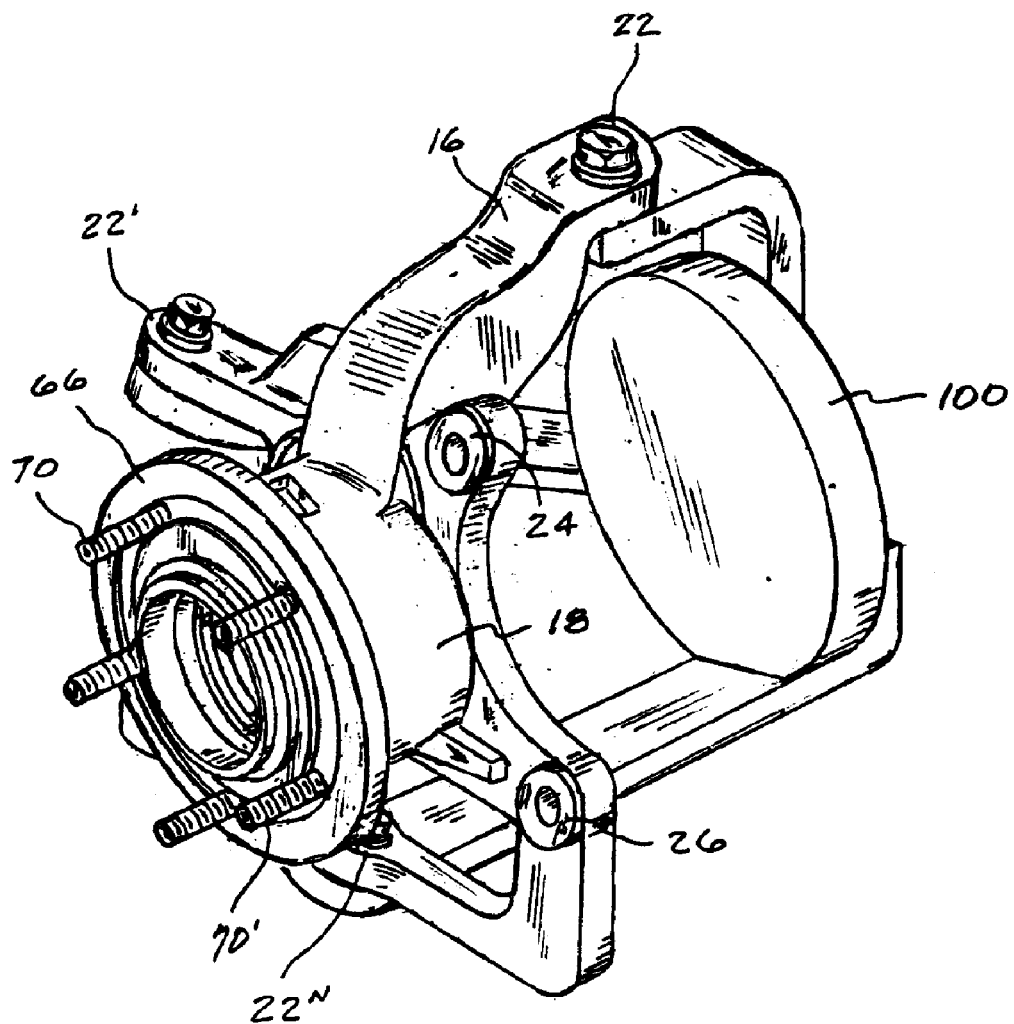
FIG. 15 is perspective view of the wheel hub and knuckle of FIG. 14 retained in a fixture.
Figure 16:
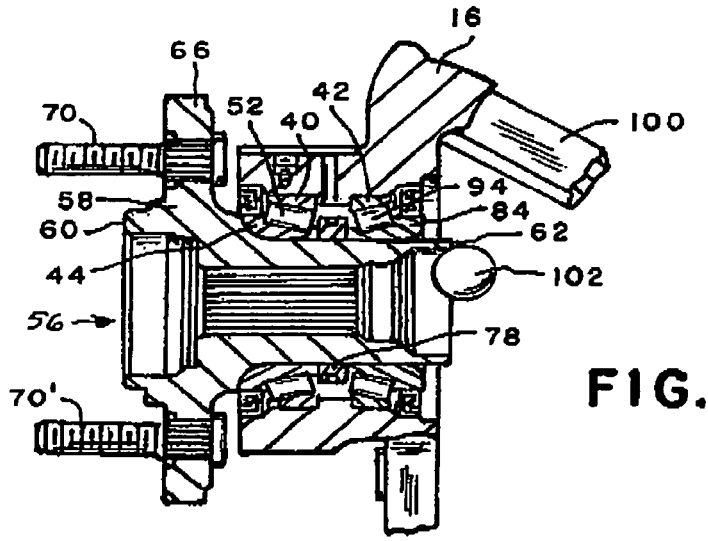
FIGS. 16–18 are sectional view of the wheel hub and knuckle of FIG. 15 wherein a tool progressively engages the cylindrical body of the wheel hub to crimp an end and form a unitary structure.
Figure 17:
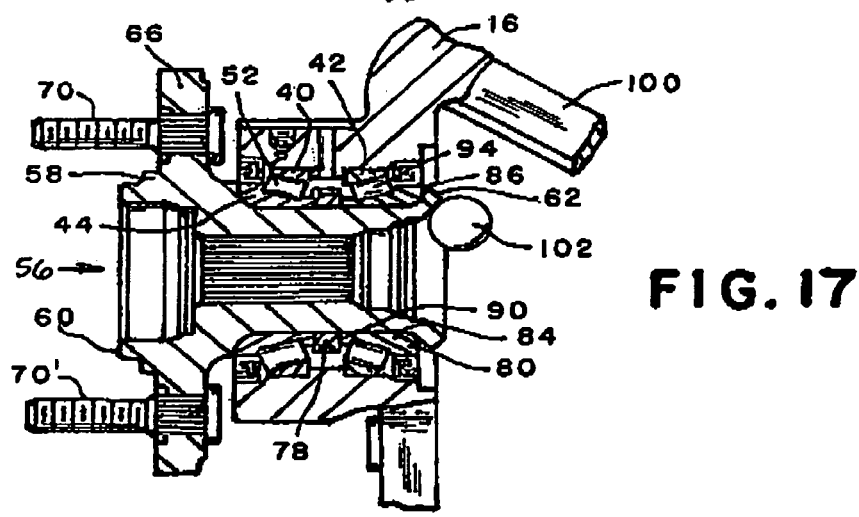
Figure 18:
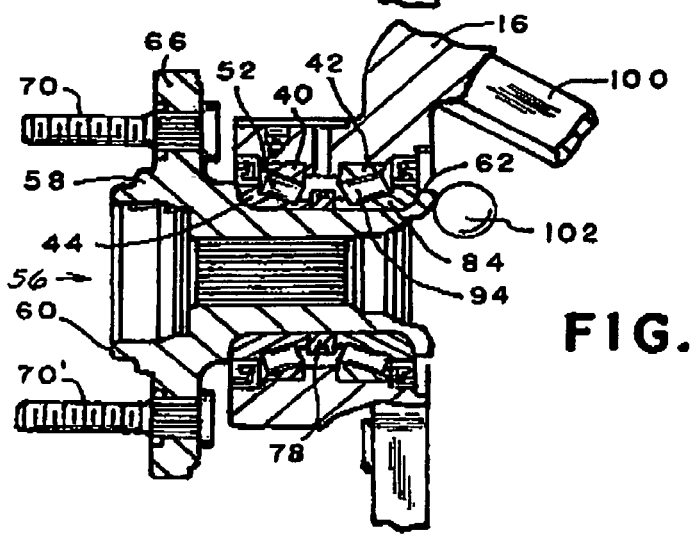

The knuckle 16 and the wheel hub 56 of FIG. 14 are placed in a fixture 100 as shown in FIG. 15 and the plurality of projections 22,22'... 22" are fixed in a manner to simulate attachment to a vehicle. While in the fixture 100, a rotating driver is connected to the wheel hub 56 and a first tool 102 is brought into engagement with the second end 62 of the cylindrical body 58. As illustrated in FIGS. 16–18, the tool 100 progressively deforms the second end 62 against end 86 of the inboard cone 80 to maintain the engagement of the first end 90 against ring 78 and define a unitary structure.

Figure 19:
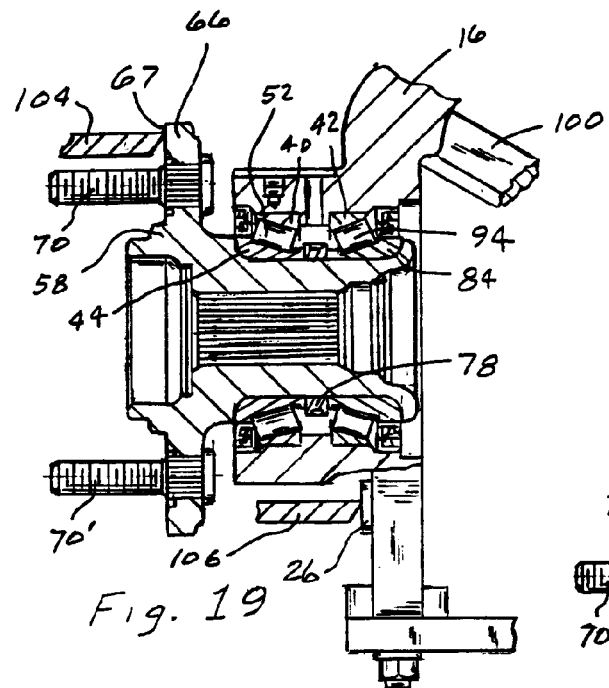
FIG. 19 is a sectional view of the unitary structure of FIG. 18 wherein a radial surface on the wheel hub and bosses on the knuckle are machined to define a perpendicular relationship with the axis of the wheel hub.

In order to enhance an alignment relationship that has been established between the axis of the wheel hub 56 and the plurality of projections 22,22'... 22" on the knuckle 16 it is desirable to machine various surfaces on the wheel hub 56 including the face 67 on radial flange 66 and bosses 24 and 26 on knuckle 16 while in this same fixture 100. As illustrated in FIG. 19, a second tool 104 is brought into engagement with face 67 the annular flange 68 on the wheel hub 56 and material removed from the face 67 to establish a surface thereon that is perpendicular to the axis of wheel hub 56 and the first 52 and second 94 roller assemblies and a third tool 106 is brought into engagement with bosses 24 and 26 to remove material on the knuckle 16 and define bracket engagement surfaces for caliper 14 are in a corresponding perpendicular relationship with the axis of the first 52 and second 94 roller assemblies and the wheel hub 56.

Figure 20:
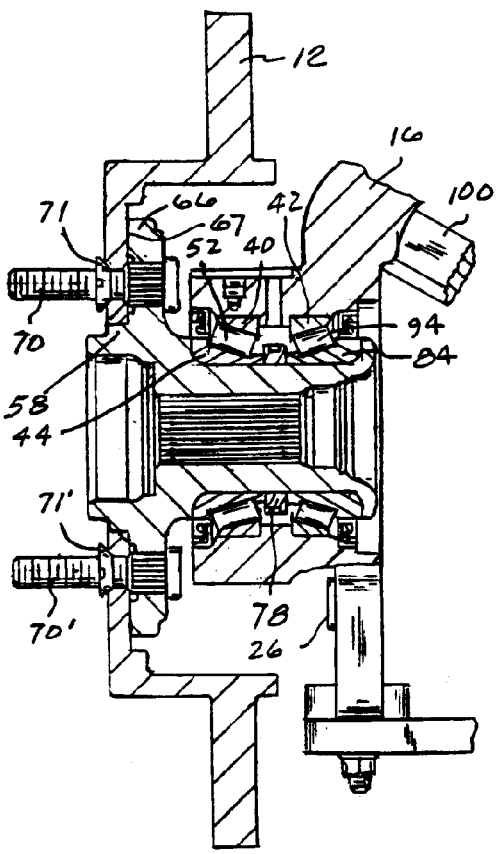
FIG. 20 is a sectional view of the wheel hub and knuckle of FIG. 19 wherein a rotor is secured to the wheel hub.

Thereafter, a rotor 12 is obtained from a source, placed on the wheel hub 56 to engage the perpendicular surface defined by face 67 and secured to studs 70,70' by nuts 71,71' as illustrated in FIG. 20.

To complete the operation in fixture 100, a fourth tool 108,108' is brought into engagement with braking surfaces 12a and 12b on rotor 12 and material is removed from the braking surfaces 12a and 12b such that a perpendicular relationship is established with the axis of the wheel hub 56, as illustrated in FIG. 21.

The knuckle 16 with the rotor 12 attached thereto is removed from fixture 100 and caliper 14 is bolted onto bosses 24 and 26 to complete the manufacture of the module corner assembly 10 as illustrated in FIG. 22. The surfaces on the friction members 14a and 14b are located parallel alignment with braking surfaces 12 and 12b such that when wheel are attached to studs 70,70' and rotated the parallel alignment is maintained.

The module corner is completed through the installation of a sensor 38a into radial bore 38 and after this time may be attached through the plurality of projections 22,22' . . . 22" to a vehicle.

The outboard cup 40, roller assembly 52, outboard cone 44 and seal 54 installed in the outboard section 28 and inboard cup 42 could be installed into the inboard section 34 of knuckle 16 before the cylindrical body 58 of wheel hub 56 is pressed into cylindrical body 18 but the tolerances may be more difficult to maintain and as a result the above described is preferred.

Figure 23:
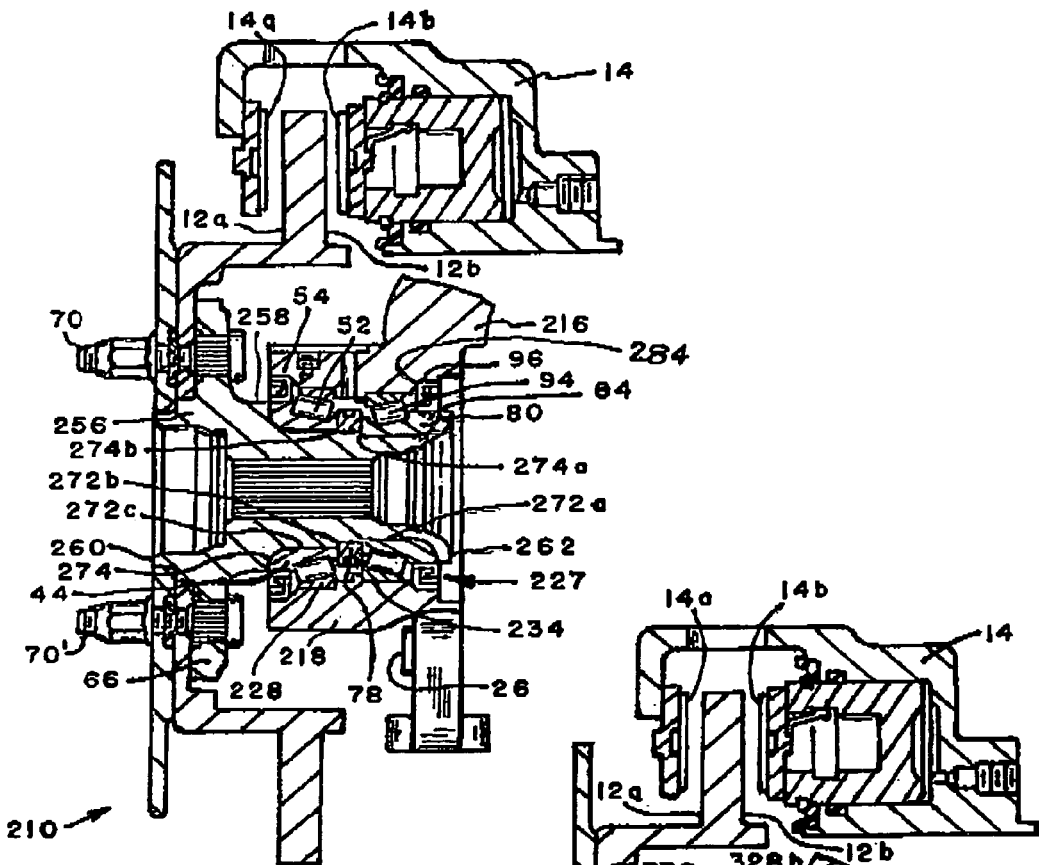
FIG. 23 is a sectional view of a secondary embodiment of a wheel hub and knuckle of the present invention wherein the outboard roller and the inboard roller are located at different radial locations with respect to the axis of the wheel hub.

The embodiment for the module corner assembly 10 as illustrated in FIG. 22 may be modified as illustrated in FIG. 23 to define a module corner assembly 210 wherein the roller assembly 52 is located at a different radius from the axis of the wheel hub 256 than roller assembly 94 to define a second corner assembly 210. In this embodiment, a knuckle 216 that is obtain from a source is selected as having a cylindrical body 258 wherein the outboard section 228 of the axial bore 227 has a larger diameter than the inboard section 234 and the wheel hub 256 is selected from a source as having cylindrical body 258 with a first end 260 having a splined bore that extends to a second end 262 and peripheral bearing surface with a first section 272a that extends from the second end 262 to a second shoulder 274a and a second section 272b that extends from the second shoulder 274a to a third shoulder 274b and a third section 272c that extends from the third shoulder 274a to shoulder 274 adjacent radial flange 66. The first section 272a has a first diameter, the second section 272b has a second diameter and the third section 272c has a third diameter such that the outboard cone 44 and roller member 52 are located on the third section 272c and the inboard cone 80 and roller member 94 are located on the first section 272c while ring 78 is located on the second section 272b. As with module corner assembly 10, the ring 78, the outboard cone 44 and/or shoulder 274b, the first linear distance "x" is measured from a face 79 on ring 78 to a first reference point 45 on the inboard cup 42. A inboard cone 80 is thereafter obtained from a source and a roller assembly 94 placed on the ramped surface 82 to obtain a linear distance "y". After either machining or selecting a different inboard cone 80 such that linear distance y" is equal to or slightly less that the first linear distance "x", the inboard cone 80 is inserted into axial bore 227 and the first section 272a. The inboard annular seal 96 is thereafter inserted into bore 227 and engages the flange 284 and cylindrical body 218 to seal the axial bore 227 form the surrounding environment. The remaining step of machining the various surface thereon in the fixture 100 and deforming the end 262 of cylindrical body 218 is the same as with module corner assembly 10 such that the braking surfaces and friction members are maintained in a parallel manner to attenuate surging and maintain substantially even wear on the rotor 12 during braking.

Figure 24:
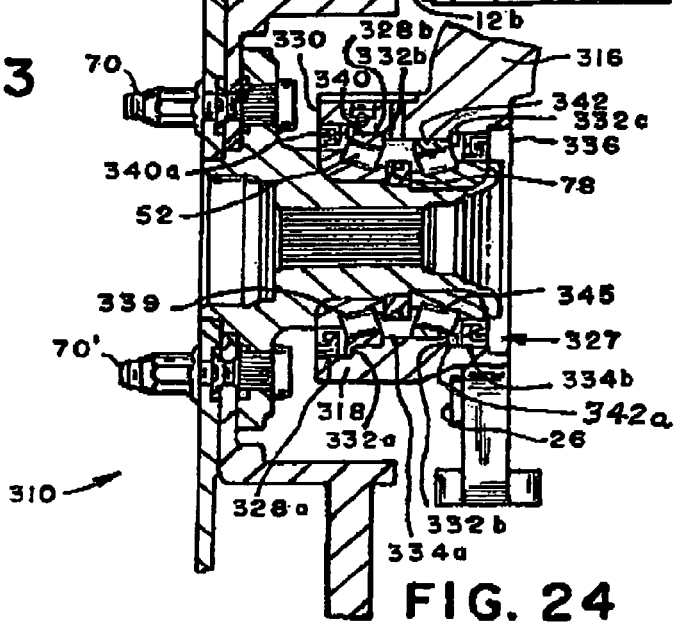
FIG. 24 is a sectional view of a secondary embodiment of a wheel hub and knuckle of the present invention wherein a outboard cup and a inboard cup have flanges that correspondingly engage shoulders in an axial bore of the knuckle to locate rollers within the wheel hub.

The embodiment for the module corner assembly 210 as illustrated in FIG. 23 was modified as illustrated in FIG. 24 to define a module corner assembly 310 wherein the outboard cup 340 and inboard cup 342 have corresponding flanges 340a and 342a that engage shoulders 332a and 332b to set races 339 and 345 within the cylindrical body 318 of knuckle 316. Module corner assembly 310 is further distinguished by knuckle 316 that is selected from a source and has a cylindrical body 318 with a stepped axial bore 327 that extends from a first end 330 to a second end 336. The stepped bore 327 has a first shoulder 332a that separates a first diameter 328a from a second diameter 328b, a second shoulder 332b that separates the second diameter 328b from a third diameter 334a, a third shoulder 332c that separates the third diameter 334a from a fourth diameter 334b with the first diameter 328a being larger than the second diameter 328b, the second diameter 328b being larger than that third diameter 334a, and the fourth diameter 334b being larger than the third diameter 334a. The second diameter 328b defining an outboard axial bore for the outboard cup 340 and the third diameter 334a defining an inboard axial bore for the inboard cup 342. The outboard cup 340 is pressed into the second diameter 328b of axial bore 327 until first flange 340a engages the first shoulder 332a while the inboard cup 342 is pressed into the axial bore 327 until flange 342a engages shoulder 332c to set the bearing races 339 and 345 within the knuckle 316. The remaining components are assembled in a manner as described above with respect to module corner assembly 210 and 10 in accordance with the present invention.

Figure 25:
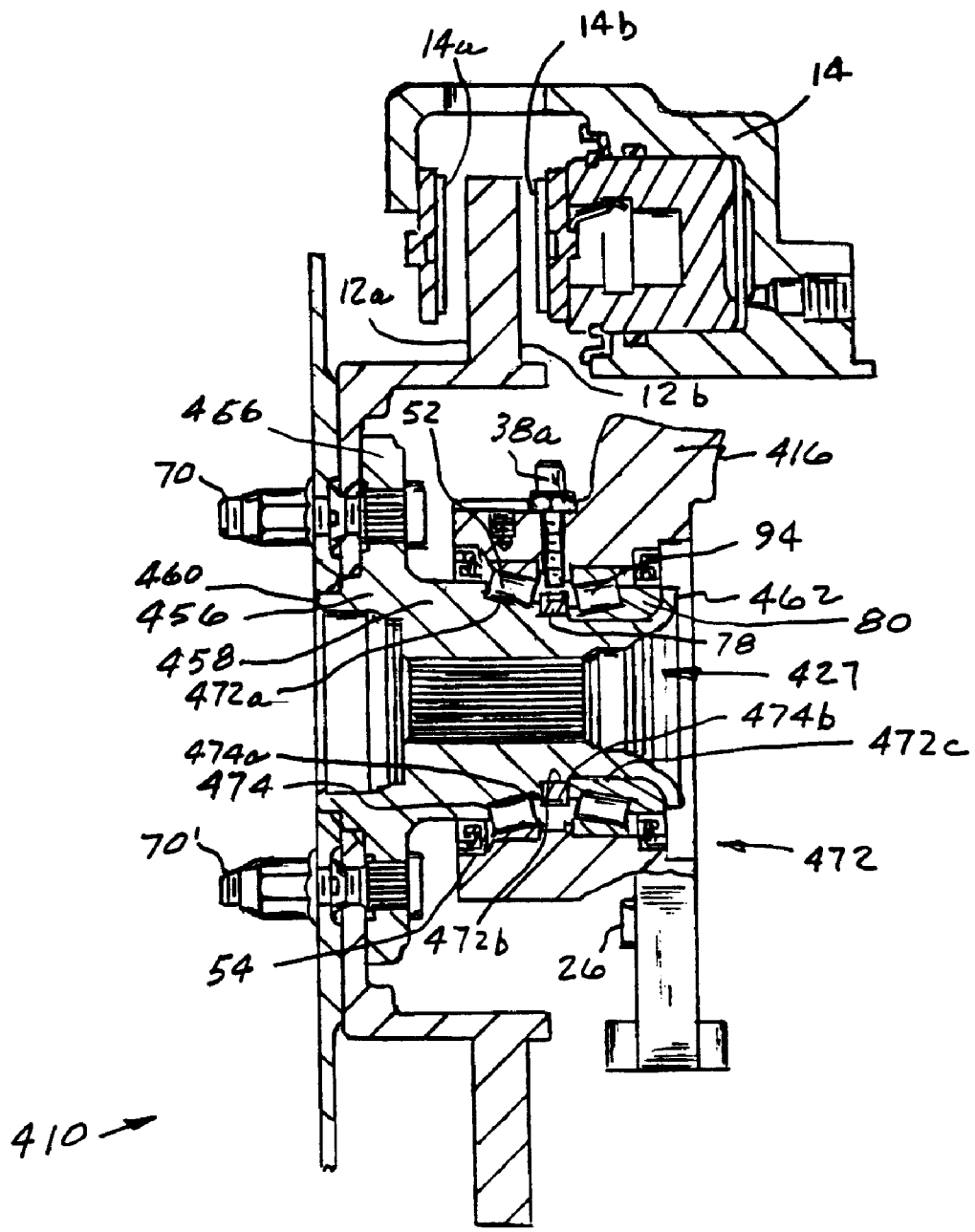
FIG. 25 is a sectional view of a secondary embodiment of a wheel hub and knuckle wherein a surface on the wheel hub is utilized as a cup to locate outboard rollers with respect to a race in the knuckle.

The embodiment for the module corner assembly 10 as illustrated in FIG. 22 may be modified as illustrated in FIG. 25 to define a module corner assembly 410 wherein a portion of the peripheral bearing surface 472 on the wheel hub 456 is used as a outboard cone for the roller assembly 52. The wheel hub 456 has a cylindrical body 458 with a first end 460 and a second end 462 with a splined stepped axial bore 427 that extends from the first end 460 to the second end 462 and is distinguished by a peripheral bearing surface 472 that extends from the second end 462 to a first shoulder 474 adjacent radial flange 66. The peripheral bearing surface 472 has a first section 472a that extends from first shoulder 474 to a second shoulder 474a, a second section 472b that extends from the second shoulder 474a to a third shoulder 474b and a third section 472c that extends from the third shoulder 474b to the second end 462. The first section 472a has a varying first diameter, the second section 472b has a second diameter and the third section 472c has a third diameter such that the varying diameter is larger than the second diameter and the second diameter is larger than the third diameter. The varying diameter of the first section 472a forming a race for the roller assembly 52. In the method of assembly of module corner assembly 410, the roller assembly 52 is inserted into the axial bore 427 of knuckle 416 until it engages a bearing surface on race 39 on the outboard cup 40 and the annular seal 54 engages housing 418 on knuckle 416. Thereafter, the wheel hub 456 is inserted into axial bore 427 and brought into engagement with the roller assembly 52 such that the second section 472b is aligned with radial bore 38 in the cylindrical body 418. The ring 78 is thereafter pressed onto the second section 472b and the remaining steps of attaching and retaining the inboard cone 80 and roller assembly 94 is attached as with module corner assembly 10 to define a unitary structure. The machining of the wheel hub 456 and knuckle 416 in a same fixture 100 is identical to that described above with respect to module corner assembly 10.

Figure 26:
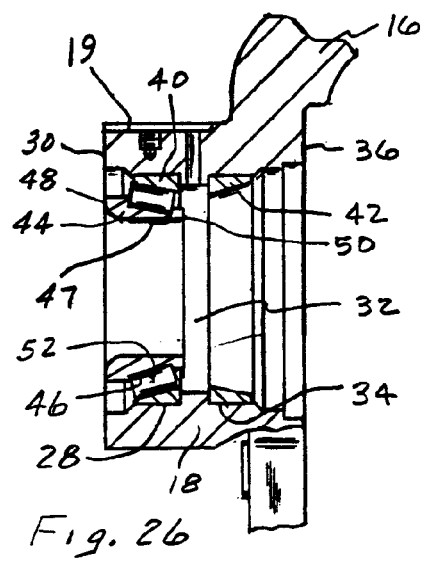
FIG. 26 is a sectional view of a secondary embodiment of a knuckle with a bearing inserted in the axial bore.
Figure 27:
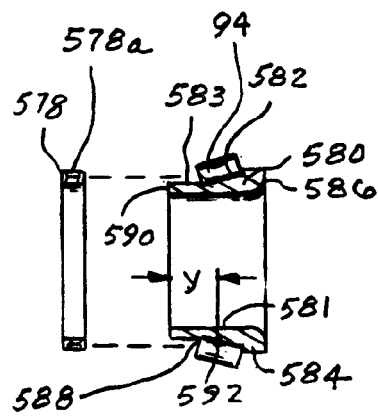
FIG. 27 is a sectional view of a secondary cup for use in the embodiment of FIG. 26.
Figure 30:
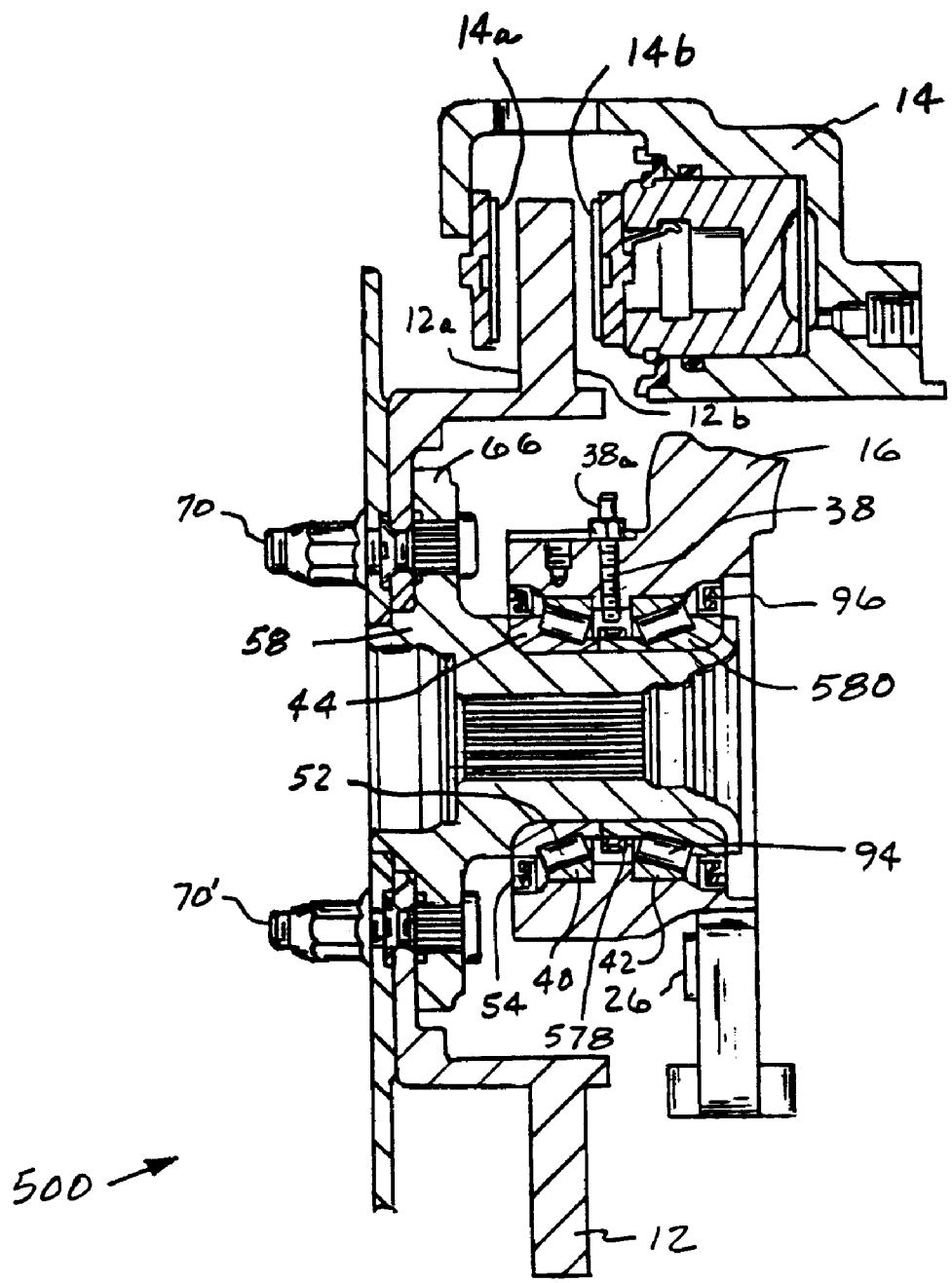
FIG. 30 is a sectional view of the corner assembly of the knuckle and wheel hub of FIG. 29.

FIG. 30 is a sectional view of a corner module 500 similar to corner module 10 but is distinguished in that ring 578 for sensor 38a is located on the inboard cone 580, although it could also be placed on an outboard cone. The inboard cone 580, as best shown in FIG. 27 has a cylindrical body with an axial bore 581 that extends from end 586 and end 590, a radial flange 584 that extends from end 586, a ramped surface 582 that extends from flange 586 to lip 588 and a uniform diameter surface 583 that extends from lip 588 to end 590. The steps in the manufacture of corner module 500 while similar to that of corner module 10 in achieving and maintaining a desired perpendicular relationship between a rotor 12 and the axis of the wheel hub 56 as specifically as follows:

a knuckle 16 is obtained from a source and defined by a cylindrical body 18 with a plurality of projections 22,22'... 22" that extend there from, an outboard axial bore 28 that extends from a first end surface 30 to an annular rib 32 and an inboard axial bore 34 that extends from a second end surface 36 to the annular rib 32. The annular rib 32 has a radial bore 38 there through that connects the axial bore to a peripheral surface 19 on the cylindrical body;

an outboard cup 40 is obtained from a source and pressed into the outboard axial bore 28 of the knuckle 16 until the outboard cup 40 engages the annular rib 32;

an inboard cup 42 is obtained from a source and pressed into the inboard axial bore 34 until the inboard cup 42 engages the annular rib 32;

an outboard cone 44 having an axial bore 47 that extends from a first end 48 to a second end 50 is obtained from a source and a first roller assembly 52 is placed on ramped surface 46 on the outboard cup 44;

the outboard cone 44 is inserted into the outboard axial bore 28 and the first roller assembly 52 is brought into engagement with a first bearing surface on the outboard cup 40, as shown in FIG. 26;

thereafter a first linear distance x is measured from a reference point (end 50) on the outboard cone 44 to a second reference point (49) on the inboard cup 42;

an inboard cone 580 is obtained from a source that is defined by an third axial bore 581 that extends from an end 586 to an end 590 and a ramped surface 582 on its peripheral surface that is located between end 586 and end 590;

a second roller assembly 94 is placed on ramped surface 582 on the inboard cone 580, as shown in FIG. 27;

a linear distance y is measured from end 590 to a reference point 592 that defines a second linear distance;

the second linear distance y is compared with first linear distance x and material is removed from end 590 if the second linear distance y is greater than the first linear distance x to match the second linear distance y with the first linear distance x or a second inboard cone is selected that does have a desired second linear distance. Under most conditions, the second linear distance y may be slightly less than the first liner distance x such that eventually a preload may be placed on the first 52 and second 94 rollers when end 62 is deformed against end 586.

When the second linear distance y matches the first linear distance x, a ring 578 having a surface with sequential differences 578a is obtained from a source and placed on uniform diameter surface 583 of the inboard cone 580 such that ring 578 is located adjacent between lip 588 to end 590, it is understood that the ring 578 could also be placed on the outboard cone 44 with a similar uniform diameter extension were provided thereon.

Figure 28:
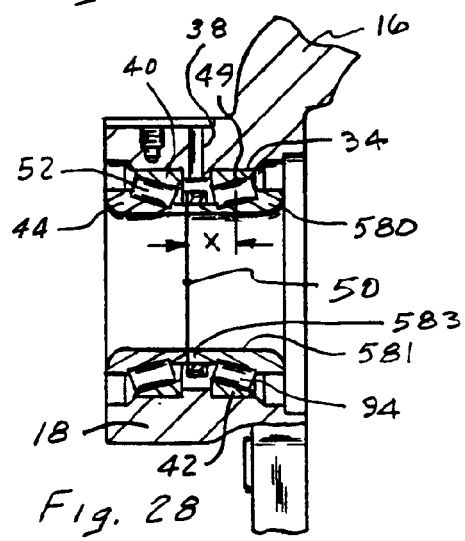
FIG. 28 is a sectional view of the knuckle of FIG. 26 with the cup of FIG. 27 installed in the axial bore.

The inboard cone 580 is inserted into the inboard axial bore 34 of knuckle 16 to bring the second roller assembly 94 into engagement with a bearing surface on the inboard cup 44 and to align the ring 578 with the radial bore 38 in the first cylindrical body 18, as illustrated in FIG. 28.

Figure 29:
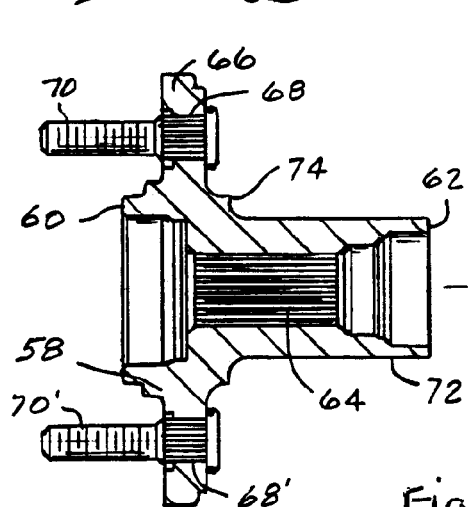
FIG. 29 is a sectional view of a wheel hub aligned with the axial bore of the knuckle of FIG. 28.
Figure 29:
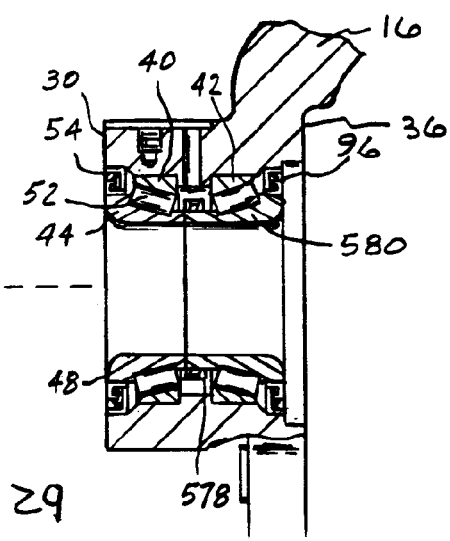

A first seal 54 is located between and engages the first end surface 30 on the knuckle 16 and the end 48 on the outboard cone 44 and a second seal 96 is located between and engages the second end surface 36 on the knuckle 16 and the inboard cone 580 to seal the outboard bore 28, axial bore and inboard bore 34 of knuckle 16 from the surrounding environment, as shown in FIG. 29;

The knuckle 16 is thereafter placed in a fixture 100 of a type illustrated in FIG. 15;

Thereafter, a wheel hub 56 defined by a second cylindrical body 58 with an axial bore 64 that extends from an end 60 an end 62, and a radial flange 66 that extends from the second cylindrical body 58, is located adjacent end 60, a plurality of axial openings 68,68' that are located a fixed radial distance from the axis of axial bore 64, and a peripheral bearing surface 72 that extends from a shoulder 74 adjacent the flange 66 to end 62 is obtained from a source.

The wheel hub 56 is brought to the knuckle 16 retained in fixture 100, illustrated in FIG. 29 and pressed into cylindrical body 18 by passing through the second axial bore 47 of the outboard cone 44 and the third axial bore 581 on the inboard cone 580 such that shoulder 74 engages the end 48 of the outboard cone 44 and the second end 62 extends past end 586 on the inboard cone 580 with the outboard cone 44 and the inboard cone 580 being located on peripheral bearing surface 72 on the wheel hub 56.

A tool is brought into engagement with end 62 of the second cylindrical body 58 and the second end 62 is deformed against end 586 of the inboard cone 580 to define a unitary structure although it is also possible to define the unitary structure by a snap ring located in a groove, a nut attached to a threaded section of on end 62.

Thereafter, the machining of the wheel hub 56 and attachment of rotor 12 to the wheel hub 56 is the same as with corner module 10 to produce corner module 500 as illustrated in FIG. 30.

Some of the steps in the manufacture of the module corner assembly may occur in a different sequenced from that described above as long as in a final series of steps a uniform machining is achieved to create a unitary structure.

What is claimed is:

1. A method of manufacturing a module corner assembly wherein a hub is attached to a knuckle through the following steps:

obtaining a knuckle from a source, said knuckle having a first cylindrical body with a plurality of projections that extend there from; an outboard axial bore that extends from a first end surface to an annular rib and an inboard axial bore that extends from a second end surface to said annular rib, said annular rib having an axial bore there through that connects said outboard and inboard axial bores; and a radial bore that extends from said axial bore to a peripheral surface on said first cylindrical body;

pressing an outboard cup into said outboard axial bore until said outboard cup engages said annular rib;

pressing an inboard cup into said inboard axial bore until said inboard cup engages said annular rib;

obtaining a wheel hub from a source, said wheel hub being defined by a second cylindrical body with a first end and a second end, a second axial bore that extends from the first end to the second end, a radial mounting flange that extends from the second cylindrical body and is located between said first end and said second end, a plurality of axial openings in the mounting flange that are located a fixed radial distance from an axis of said second axial bore, and a peripheral bearing surface that extends from said second end to a shoulder adjacent said radial mounting flange;

pressing an outboard cone into engagement with said first shoulder on said second cylindrical body, said outboard cone having an outboard annular seal retained on a peripheral surface thereof;

pressing a ring onto said peripheral bearing surface of said second cylindrical body, said ring having sequential surface differences thereon;

placing a first roller assembly on said outboard cone;

pressing said second cylindrical body into said first cylindrical body such that said first roller assembly engages a first bearing surface on said outboard cup, said outboard annular seal engages said outboard axial bore to define an outboard seal with respect to the surrounding environment and said sequential surface on said ring is aligned with said radial bore in said first cylindrical body;

measuring a first linear distance from a face on said ring to a first reference point on said inboard cup;

obtaining an inboard cone from a source;

placing a second roller assembly on said inboard cone;

measuring a second linear distance from a first end on said inboard cone to a second reference point on said second roller assembly, comparing said first linear distance with said second linear distance;

removing material from said inboard cone when said second linear distance is greater than said first linear distance to match said second linear distance with said first linear distance;

pressing said inboard cone onto said peripheral bearing surface of said second cylindrical body until said inboard cone engages said face on said ring such that said second roller assembly engages a second bearing surface on said inboard cup;

pressing an inboard annular seal onto said inboard cup such that said inboard annular seal engages said inboard axial bore to define an inboard seal with respect to the surrounding environment;

placing said knuckle and wheel hub in a fixture; and bringing a tool into engagement with said second end of said second cylindrical body to deform said second end of said second cylindrical body such that said inboard cone is retained in engagement with said ring to define a unitary structure.

2. A method of manufacturing a module corner assembly for a vehicle through the following steps:

obtaining a knuckle from a source, said knuckle having a first cylindrical body with a plurality of projections that extend there from; an outboard axial bore that extends from a first end surface to an annular rib and an inboard axial bore that extends from a second end surface to said annular rib, said annular rib having an axial bore there through that connects said outboard and inboard axial bores; and a radial bore that extends from said axial bore to a peripheral surface on said first cylindrical body;

obtaining an outboard cup from a source and pressing said outboard cup into said outboard axial bore until said outboard cup engages said annular rib;

obtaining an inboard cup from a source and pressing said inboard cup into said inboard axial bore until said inboard cup engages said annular rib;

obtaining a outboard cone from a source;

placing a first roller assembly on said outboard cone;

attaching an outboard annular seal to a peripheral surface of said outboard cone;

pressing said outboard cone into said outboard axial bore to bring said first roller assembly into engagement with a first bearing surface on said outboard cup and said outboard annular seal into engagement with said outboard axial bore to define an outboard seal for said first roller assembly;

obtaining a ring having a surface with sequential differences thereon;

inserting said ring into said inboard axial bore to bring said surface on said ring into alignment with said radial bore in said first cylindrical body;

obtaining a wheel hub from a source, said wheel hub being defined by a second cylindrical body with a first end and a second end, a second axial bore that extends from the first end to the second end, a radial flange that extends from said second cylindrical body and is located adjacent said first end, said flange having a plurality of axial openings that are located a fixed radial distance from an axis of said second axial bore, and a peripheral bearing surface that extends from said second end to a shoulder adjacent said radial flange;

pressing said second cylindrical body into said first cylindrical body such that said peripheral bearing surface passes through said ring and said shoulder on said second cylindrical body engages said outboard cone;

measuring a first linear distance from a face on said ring to a first reference point on said inboard cup;

obtaining an inboard cone from a source;

placing a second roller assembly on said inboard cone;

obtaining a second linear distance from an end of said inboard cone to a second reference point on said second roller assembly;

comparing said first linear distance with said second linear distance;

removing material from said inboard cone when said second linear distance is greater than said first linear distance to match said second linear distance with said first linear distance;

pressing said inboard cone onto said peripheral bearing surface of said second cylindrical body until said inboard cup engages said face on said ring;

pressing an inboard annular seal onto said inboard cone such that said inboard annular seal engages said inboard axial bore in said first cylindrical body to define an inboard seal with respect to the surrounding environment;

placing said knuckle and wheel hub in a fixture; and bringing a tool into engagement with said second end of said second cylindrical body to deform said second end of said second cylindrical body to define a unitary structure.

3. The method of manufacturing a module corner assembly wherein a hub is attached to a knuckle as recited in claim 2 wherein said step of obtaining a knuckle from a source further includes the step of selecting a knuckle having a first cylindrical body with said outboard axial bore having a larger diameter than said inboard axial bore; and wherein said step of obtaining said wheel hub from a source further includes the step of selecting a wheel hub with a second cylindrical body with a peripheral bearing surface having a first section that extends from said second end to a second shoulder and a second section that extends from said second shoulder to a third shoulder and a third section that extends from said third shoulder to said shoulder to adjacent said radial flange, said first section having a first diameter, said second section having a second diameter and said third section having a third diameter such that said first roller assembly and said second roller assembly are located at different radial distances from the axis of said second cylindrical member and said ring is located on said second section in alignment with said radial bore in said first cylindrical member.

4. A method of manufacturing a module corner assembly wherein a hub is attached to a knuckle through the following steps:

obtaining a knuckle from a source, said knuckle having a first cylindrical body with a plurality of projections that extend there from, an outboard axial bore that extends from a first end surface to an annular rib and an inboard axial bore that extends from a second end surface to said annular rib, said annular rib having an axial bore there through that connects said outboard and inboard axial bores; and a radial bore that extends from said axial bore to a peripheral surface on said first cylindrical body;

pressing an outboard cup into said outboard axial bore until said outboard cup engages said annular rib;

pressing an inboard cup into said inboard axial bore until said inboard cup engages said annular rib;

locating a first roller assembly in said outboard axial bore to bring said first roller assembly into engagement with a first bearing surface on said outboard cup;

pressing an outboard annular seal into said outboard axial bore;

obtaining a wheel hub from a source, said wheel hub being defined by a second cylindrical body with a first end and a second end, a second axial bore that extends from the first end to the second end, a radial flange that extends from said second cylindrical body and is located adjacent said first end, said flange having a plurality of axial openings that are located a fixed radial distance from an axis of said second axial bore, and a peripheral bearing surface with a first section that extends from said second end to a first shoulder and a second section that extends from said first shoulder to a second shoulder adjacent said radial flange;

pressing said second cylindrical body into said first cylindrical body such that said second section of said bearing surface engages said first bearing assembly, said first shoulder is being aligned with said radial bore in said first cylindrical body and said outboard annular seal engages said second cylindrical body to define an outboard seal with respect to the surrounding environment;

obtaining a ring having a surface with sequential differences thereon;

inserting said ring into said inboard axial bore;

pressing said ring against said first shoulder on said first section of said peripheral bearing surface of said second cylindrical body;

measuring a first linear distance from a face on said ring to a first reference point on said inboard cup;

obtaining an inboard cone from a source;

placing a second roller assembly on said inboard cone;

obtaining a second linear distance between a second reference point on said second roller assembly and a first end of said inboard cone, comparing said first linear distance with said second linear distance;

removing material from said inboard cone when said second linear distance is greater than said first linear distance to match said second linear distance with said first linear distance;

pressing said inboard cone onto said first section of said peripheral bearing surface of said second cylindrical body until said inboard cup engages said face on said ring;

pressing an inboard annular seal onto said inboard cone such that said inboard annular seal engages said inboard axial bore in said first cylindrical body to define an inboard seal with respect to the surrounding environment;

placing said knuckle and wheel hub in a fixture; and bringing a tool into engagement with said second end of said second cylindrical body to deform said second end of said second cylindrical body to define a unitary structure.

5. The method of manufacturing a module corner assembly as recite in claim 4 wherein said knuckle and hub are in said fixture further including the steps of:

bringing a second tool into engagement with a face on said annular flange of said wheel hub to remove material from said face on said annular flange and establish a surface thereon that is perpendicular to the axis of wheel hub; and bringing a third tool into engagement with bosses on said knuckle to remove material there from and define a bracket for a caliper such that friction members retained in said caliper are located in a plane that is parallel with said axis of said wheel hub.

6. The method of manufacturing a module corner assembly as recited in claim 5 further including:

obtaining a rotor from a source and attaching the rotor to the wheel hub such that the rotor engages said face on said annular flange and braking surfaces are aligned in a perpendicular plane with respect to the axis of said wheel hub.

7. The method of manufacturing a module corner assembly as recited in claim 6 while said knuckle and hub are in said fixture further including the steps of:

bringing a fourth tool into engagement with said braking surfaces on said rotor and removing any material that would prevent said braking surfaces from being located in perpendicular planes with respect to said axis of said wheel hub.

8. A method of manufacturing a module corner assembly for a vehicle through the following steps:

obtaining a knuckle from a source, said knuckle having a first cylindrical body with a plurality of projections that extend there from, a first stepped axial bore having a first shoulder that separates a first diameter from a second diameter, a second shoulder that separates the second diameter from a third diameter, a third shoulder that separates the third diameter from a fourth diameter with said first diameter being larger than said second diameter, said second diameter being larger than said third diameter, said fourth diameter being larger than said third diameter, said second diameter defining an outboard axial bore and said third diameter defining an inboard axial bore, and a radial bore that extends from said second diameter to a peripheral surface on said first cylindrical body;

obtaining an outboard cup having a first flange thereon from a source and pressing said outboard cup into said second diameter until said first flange engages said first shoulder;

obtaining an inboard cup having a second flange thereon from a source and pressing said inboard cup into said third diameter until said second flange engages said third shoulder;

obtaining an outboard cone from a source;

placing a first roller assembly on said outboard cone;

attaching an outboard annular seal to a peripheral surface of said outboard cone;

pressing said outboard cone into said outboard axial bore to bring said first roller assembly into engagement with a first bearing surface on said outboard cup and said outboard annular seal into engagement with said first diameter of said first stepped axial bore to define an outboard seal for said first roller assembly;

obtaining a wheel hub from a source, said wheel hub being defined by a second cylindrical body with a first end and a second end, a second stepped axial bore that extends from the first end to the second end, a radial flange that extends from said second cylindrical body and is located adjacent said first end, said flange having a plurality of axial openings that are located a fixed radial distance from an axis of said second axial bore and a peripheral bearing surface that extends from said second end to a first shoulder adjacent said radial flange, said peripheral bearing surface being defined by a first section that extends from said first shoulder to a second shoulder and a second section that extends from said second shoulder to a third shoulder and a third section that extends from said third shoulder to said second end, said first section having a first diameter, said second section having a second diameter and said third section having a third diameter such that said first diameter is larger than said second diameter and said second diameter is larger than said third diameter;

pressing said second cylindrical body into said first cylindrical body such that said peripheral bearing surface passes through said first stepped bore until said first shoulder on said second cylindrical body engages said outboard cone;

obtaining a ring having a surface with sequential differences thereon;

inserting said ring into said inboard axial bore of said first cylindrical body to bring said surface on said ring into alignment with said radial bore in said first cylindrical body by pressing said ring onto said second section of said peripheral bearing surface of said second cylindrical body until said second shoulder is engaged;

measuring a first linear distance from a face on said ring to a first reference point on said inboard cup;

obtaining an inboard cone from a source;

placing a second roller assembly on said inboard cone;

obtaining a second linear distance between a second reference point on said second roller assembly to a first end on said inboard cone;

comparing said first linear distance with said second linear distance;

removing material from said inboard cone when said second linear distance is greater than said first linear distance to match said second linear distance with said first linear distance;

pressing said inboard cone onto said third section of said peripheral bearing surface of said second cylindrical body until said inboard cup engages said face on said ring;

pressing an inboard annular seal onto said inboard cone such that said inboard annular seal engages said inboard axial bore in said first cylindrical body to define an inboard seal with respect to the surrounding environment;

placing said knuckle and wheel hub in a fixture; and bringing a tool into engagement with said second end of said second cylindrical body to deform said second end of said second cylindrical body to define a unitary structure.

9. The method of manufacturing a module corner assembly as recited in claim 8 wherein said first roller assembly and said second roller assembly are located at different radial distances from the axis of said second cylindrical member.

10. The method of manufacturing a module corner assembly as recite in claim 9 wherein said knuckle and hub are in said fixture further including the steps of:

bringing a second tool into engagement with a face on said annular flange of said wheel hub to remove material from said face on said annular flange and establish a surface thereon that is perpendicular to the axis of wheel hub; and bringing a third tool into engagement with bosses on said knuckle to remove material there from and define a bracket for a caliper such that friction members retained in said caliper are located in a plane that is parallel with said axis of said wheel hub.

11. The method of manufacturing a module corner assembly as recited in claim 10 further including:

obtaining a rotor from a source and attaching the rotor to the wheel hub such that the rotor engages said face on said annular flange and braking surfaces are aligned in a perpendicular plane with respect to the axis of said wheel hub.

12. The method of manufacturing a module corner assembly as recited in claim 11 wherein said knuckle and hub are in said fixture further including the steps of:

bringing a fourth tool into engagement with said braking surfaces on said rotor and removing any material that would prevent said braking surfaces from being located in perpendicular planes with respect to said axis of said wheel hub.

13. The method of manufacturing a module corner assembly as recited in claim 12 further including the step of:

attaching a caliper to said knuckle through attachment with said bosses such that said caliper straddles said rotor and engagement surfaces on friction members carried by said caliper are in parallel alignment with said braking surfaces.

14. The method of manufacturing a module corner assembly as recited in claim 12 further including the step of:

attaching a caliper to said knuckle through attachment with said bosses such that said caliper straddles said rotor and engagement surfaces on friction members carried by said caliper are in parallel alignment with said braking surfaces.

15. A method of manufacturing a module corner assembly for a vehicle through the following steps:

obtaining a knuckle from a source, said knuckle having a first cylindrical body with a plurality of projections that extend there from; an outboard axial bore that extends from a first end surface to an annular rib and an inboard axial bore that extends from a second end surface to said annular rib, said annular rib having an axial bore there through that connects said outboard and inboard axial bores and a radial bore that extends to a peripheral surface on said first cylindrical body;

pressing an outboard cup into said outboard axial bore until said outboard cup engages said annular rib;

pressing an inboard cup into said inboard axial bore until said inboard cup engages said annular rib;

obtaining a wheel hub from a source, said wheel hub being defined by a second cylindrical body with a first end and a second end, a second axial bore that extends from the first end to the second end, a radial flange that extends from said second cylindrical body and is located adjacent said first end, said flange having a plurality of axial openings that are located a fixed radial distance from an axis of said second axial bore, and a peripheral bearing surface defined by a first section that extends from said first shoulder adjacent said flange to a second shoulder and a second section that extends from said second shoulder to a third shoulder and a third section that extends from said third shoulder to said second end, said first section having a variably first diameter, said second section having a second diameter and said third section having a third diameter such that said first diameter is larger and increased from said second diameter and said second diameter is larger than said third diameter;

attaching an outboard annular seal to said peripheral bearing surface between said first shoulder and said radial flange of said second cylindrical body;

locating a first roller assembly in said first section of said peripheral bearing surface of said second cylindrical body;

pressing said second cylindrical body into said first cylindrical body such that said first bearing assembly engages said outboard cup, said second section is aligned with said radial bore in said first cylindrical body and said outboard annular seal engages said first cylindrical body to define an outboard seal with respect to the surrounding environment;

obtaining a ring having a surface with sequential differences thereon;

inserting said ring into said inboard axial bore of said first cylindrical body;

pressing said ring onto second section of said peripheral bearing surface of said second cylindrical body until said second shoulder is engaged;

measuring a first linear distance from a face on said ring to a first reference point on said inboard cup;

obtaining an inboard cone from a source;

placing a second roller assembly on said inboard cone;

obtaining a second linear distance from a first end on said inboard cone and a second reference point on said second roller assembly;

comparing said first linear distance with said second linear distance;

removing material from said inboard cone when said second linear distance is greater than said first linear distance to match said second linear distance with said first linear distance;

pressing said inboard cone onto said third section of said peripheral bearing surface of said second cylindrical body until said inboard cup engages said face on said ring;

pressing an inboard annular seal onto said inboard cone such that said inboard annular seal engages said inboard axial bore in said first cylindrical body to define an inboard seal with respect to the surrounding environment;

placing said knuckle and wheel hub in a fixture; and bringing a tool into engagement with said second end of said second cylindrical body to deform said second end of said second cylindrical body to define a unitary structure.

16. A method of manufacturing a module corner assembly including the following steps:

obtaining a knuckle from a source, said knuckle having a first cylindrical body with a plurality of projections that extend there from, a first stepped axial bore having a first shoulder that separates a first diameter from a second diameter, a second shoulder that separates the second diameter from a third diameter, a third shoulder that separates the third diameter from a fourth diameter, a fourth shoulder that separates the fourth diameter from a fifth diameter with said first diameter being larger than said second diameter, said second diameter being larger than said third diameter, said fourth diameter being larger than said third diameter and said fifth diameter being larger than said fourth diameter, said second diameter defining an outboard axial bore and said third diameter defining an inboard axial bore, and a radial bore that extends from said second diameter to a peripheral surface on said first cylindrical body;

obtaining an outboard cup having a first flange thereon from a source and pressing said outboard cup into said second diameter until said first flange engages said first shoulder;

obtaining an inboard cup having a second flange thereon from a source and pressing said inboard cup into said third diameter until said second flange engages said third shoulder;

obtaining an outboard cone from a source;

placing a first roller assembly on said outboard cone;

attaching an outboard annular seal to a peripheral surface of said outboard cone;

pressing said outboard cone into said outboard axial bore to bring said first roller assembly into engagement with a first bearing surface on said outboard cup and said outboard annular seal into engagement with said first diameter of said first stepped axial bore to define an outboard seal for said first roller assembly;

obtaining a wheel hub from a source, said wheel hub being defined by a second cylindrical body with a first end and a second end, a second stepped axial bore that extends from the first end to the second end, a radial flange that extends from said second cylindrical body and is located adjacent said first end, said flange having a plurality of axial openings that are located a fixed radial distance from an axis of said second axial bore, and a peripheral bearing surface that extends from said second end to a first shoulder adjacent said radial flange, said peripheral bearing surface being defined by a first section that extends from said first shoulder to a second shoulder and a second section that extends from said second shoulder to a third shoulder and a third section that extends from said third shoulder to said second end, said first section having a first diameter, said second section having a second diameter and said third section having a third diameter such that said first diameter is larger than said second diameter and said second diameter is larger than said third diameter;

pressing said second cylindrical body into said first cylindrical body such that said peripheral bearing surface of said second cylindrical body passes through said first stepped bore until said first shoulder on said second cylindrical body engages said outboard cone;

obtaining a ring having a surface with sequential differences thereon;

inserting said ring into said inboard axial bore of said first cylindrical body to bring said surface on said ring into alignment with said radial bore in said first cylindrical body by pressing said ring onto said second section of said peripheral bearing surface of said second cylindrical body until said second shoulder is engaged;

measuring a first linear distance from a face on said ring to a first reference point on said inboard cup;

obtaining an inboard cone from a source;

placing a second roller assembly on said inboard cone;

obtaining a second linear distance from a first end on said inboard cone and a second reference point located on said second roller assembly;

comparing said first linear distance with said second linear distance;

removing material from said inboard cone when said second linear distance is greater than said first linear distance to match said second linear distance with said first linear distance;

pressing said inboard cone onto said third section of said peripheral bearing surface of said second cylindrical body until said inboard cup engages said face on said ring;

pressing an inboard annular seal onto said inboard cone such that said inboard annular seal engages said inboard axial bore in said first cylindrical body to define an inboard seal with respect to the surrounding environment;

placing said knuckle and wheel hub in a fixture; and bringing a tool into engagement with said second end of said second cylindrical body to deform said second end of said second cylindrical body to define a unitary structure.

17. A method of manufacturing a module corner assembly wherein a hub is attached to a knuckle through the following steps:

obtaining a knuckle from a source, said knuckle having a first cylindrical body with a plurality of projections that extend there from; an outboard axial bore that extends from a first end surface to an annular rib and an inboard axial bore that extends from a second end surface to said annular rib, said annular rib having an axial bore there through that connects said outboard and inboard axial bores; and a radial bore that extends from said axial bore to a peripheral surface on said first cylindrical body;

pressing an outboard cup obtained from a source into said outboard axial bore of said knuckle until said outboard cup engages said annular rib;

pressing an inboard cup obtained from a source into said inboard axial bore until said inboard cup engages said annular rib;

obtaining an outboard cone from a source and placing a first roller assembly on said outboard cone, said outboard cone having a second axial bore that extends from a first end to a second end;

inserting said outboard cone into said outboard axial bore to bring said first roller assembly into engagement with a first bearing surface on said outboard cup;

measuring a first linear distance from a reference point on said outboard cone to a second reference point on said inboard cup;

obtaining an inboard cone from a source, said inboard cone having a third axial bore that extends from a first end to a second end;

placing a second roller assembly on said inboard cone;

obtaining a second linear distance from an end on said inboard cone and a third reference point on said second roller assembly, comparing said first linear distance with said second linear distance;

removing material from said inboard cone when said second linear distance is greater than said first linear distance to match said second linear distance with said first linear distance;

obtaining a ring having a surface with sequential differences thereon from a source and placing said ring on said inboard cone;

inserting said inboard cone into said inboard axial bore of said knuckle to bring said second roller assembly into engagement with a bearing surface on said inboard cup and to align said ring with said radial bore in said first cylindrical body;

placing a first seal between said first end surface on said knuckle and said outboard cone and a second seal between said second end surface on said knuckle and said inboard cone to seal said outboard bore, axial bore and inboard bore from the surrounding environment;

placing said knuckle in a fixture;

obtaining a wheel hub from a source, said wheel hub being defined by a second cylindrical body with a first end and a second end, a fourth axial bore that extends from the first end to the second end, a radial flange that extends from said second cylindrical body and is located adjacent said first end, said flange having a plurality of axial openings that are located a fixed radial distance from an axis of said fourth axial bore, and a peripheral bearing surface that extends from a shoulder adjacent said flange to said second end;

pressing said second cylindrical body of said wheel hub into second axial bore of said outboard cone and said third axial bore of said inboard cone such that said shoulder engages said first end of said outboard cone and said second end extends past said first end of said inboard cone with said outboard cone and said inboard cone being located on said peripheral bearing surface on said wheel hub; and bringing a tool into engagement with said second end of said second cylindrical body to deform said second end of said second cylindrical body to define a unitary structure.

18. The method of manufacturing a module corner assembly as recited in claim 17 wherein while said knuckle and hub are in said fixture further including the steps of:

bringing a second tool into engagement with a face of said annular flange on said wheel hub to remove material from said face and establish a surface thereon that is perpendicular to the axis of wheel hub; and bringing a third tool into engagement with bosses on said knuckle to remove material there from and define a bracket for a caliper such that friction members retained in said caliper are located in a plane that is parallel with said axis of said wheel hub.

19. The method of manufacturing a module corner assembly as recited in claim 18 further including:

obtaining a rotor from a source and attaching the rotor to the wheel hub such that the rotor engages said face on said annular flange and the braking surfaces are aligned in a perpendicular plane with respect to the axis of said wheel hub.

20. The method of manufacturing a module corner assembly as recited in claim 19 wherein said knuckle and hub are in said fixture further including the steps of bringing a third tool into engagement with said braking surfaces on said rotor and removing any material that would prevent said braking surfaces from being located in perpendicular planes with respect to said axis of said wheel hub.

21. The method of manufacturing a module corner assembly as recited in claim 20 further including the step of:

attaching a caliper to said knuckle through attachment with said bosses such that said caliper straddles said rotor and engagement surfaces on friction members carried by said caliper are in parallel alignment with said braking surfaces.

22. A method of manufacturing a module corner assembly wherein a hub is attached to a knuckle through the following steps:

obtaining a knuckle from a source, said knuckle having a first cylindrical body with a plurality of projections that extend there from; an outboard axial bore that extends from a first end surface to an annular rib and an inboard axial bore that extends from a second end surface to said annular rib, said annular rib having an axial bore there through that connects said outboard and inboard axial bores;

pressing an outboard cup obtained from a source into said outboard axial bore of said knuckle until said outboard cup engages said annular rib;

pressing an inboard cup obtained from a source into said inboard axial bore until said inboard cup engages said annular rib;

obtaining an outboard cone from a source and placing a first roller assembly on said outboard cone, said outboard cone having a second axial bore that extends from a first end to a second end;

inserting said outboard cone into said outboard axial bore to bring said first roller assembly into engagement with a first bearing surface on said outboard cup;

measuring a first linear distance from a reference point on said outboard cone to a second reference point on said inboard cup;

obtaining an inboard cone from a source, said inboard cone having a third axial bore that extends from a first end to a second end;

placing a second roller assembly on said inboard cone;

obtaining a second linear distance from a first end on said inboard cone and a third reference point on said second roller assembly;

comparing said first linear distance with said second linear distance;

removing material from said inboard cone when said second linear distance is greater than said first linear distance to approximately match said second linear distance with said first linear distance;

inserting said inboard cone into said inboard axial bore of said knuckle to bring said second roller assembly into engagement with a bearing surface on said inboard cup;

placing a first seal between said first end surface on said knuckle and said outboard cone and a second seal between said second end surface on said knuckle and said inboard cone to seal said outboard bore, axial bore and inboard bore from the surrounding environment;

placing said knuckle in a fixture;

obtaining a wheel hub from a source, said wheel hub being defined by a second cylindrical body with a first end and a second end, a fourth axial bore that extends from the first end to the second end, a radial flange that extends from said second cylindrical body and is located adjacent to said first end, said flange having a plurality of axial openings that are located a fixed radial distance from an axis of said fourth axial bore, and a peripheral bearing surface that extends from a shoulder adjacent to said flange to said second end;

pressing said second cylindrical body of said wheel hub into second axial bore of said outboard cone and said third axial bore of said inboard cone such that said shoulder engages said first end of said outboard cone and said second end of said second cylindrical body extends past said first end of said inboard cone with said outboard cone and said inboard cone being located on said peripheral bearing surface on said wheel hub; and holding said second end of said second cylindrical body in engagement with said first end of said inboard cup to define a unitary structure.

\* \* \* \* \*